(12) United States Patent
Poupyrev (10) Patent No.: US 9,600,080 B2
(45) Date of Patent: Mar. 21, 2017

(54) NON-LINE-OF-SIGHT RADAR-BASED GESTURE RECOGNITION

(71) Applicant: Google Inc., Mountain View, CA (US)

(72) Inventor: Ivan Poupyrev, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 84 days.

(21) Appl. No.: 14/582,896

(22) Filed: Dec. 24, 2014

(65) Prior Publication Data

US 2016/0098089 A1   Apr. 7, 2016

Related U.S. Application Data

(60) Provisional application No. 62/059,099, filed on Oct. 2, 2014.

(51) Int. Cl.
| | |
|---|---|
| *G09G 5/00* | (2006.01) |
| *G06F 3/01* | (2006.01) |
| *G01S 13/02* | (2006.01) |
| *H04N 5/232* | (2006.01) |
| *G01S 7/41* | (2006.01) |

(Continued)

(52) U.S. Cl.
CPC .............. *G06F 3/017* (2013.01); *G01S 7/41* (2013.01); *G01S 13/02* (2013.01); *G01S 13/04* (2013.01); *G06K 9/00335* (2013.01); *G06K 9/00355* (2013.01); *H04N 5/23229* (2013.01); *G01S 7/40* (2013.01); *G01S 7/415* (2013.01); *G01S 13/0209* (2013.01); *G01S 13/723* (2013.01); *G01S 13/867* (2013.01); *G01S 2013/462* (2013.01)

(58) Field of Classification Search
CPC ......... G06F 3/0346; G06F 3/017; G01S 13/02
USPC ........................................................ 345/156
See application file for complete search history.

(56) References Cited

U.S. PATENT DOCUMENTS

| | | |
|---|---|---|
| 3,610,874 A | 10/1971 | Gagliano |
| 3,953,706 A | 4/1976 | Harris et al. |
| | (Continued) | |

FOREIGN PATENT DOCUMENTS

| | | |
|---|---|---|
| DE | 102011075725 | 11/2012 |
| DE | 102013201359 | 7/2014 |
| | (Continued) | |

OTHER PUBLICATIONS

"Philips Vital Signs Camera", Retrieved From: <http://www.vitalsignscamera.com/>Apr. 15, 2015, Jul. 17, 2013, 2 pages.

(Continued)

*Primary Examiner* — Jennifer Nguyen
(74) *Attorney, Agent, or Firm* — Wolfe-SBMC (57) ABSTRACT

This document describes techniques and devices for non-line-of-sight radar-based gesture recognition. Through use of the techniques and devices described herein, users may control their devices through in-the-air gestures, even when those gestures are not within line-of-sight of their device's sensors. Thus, the techniques enable users to control their devices in many situations in which control is desired but conventional techniques do permit effective control, such as to turn the temperature down in a room when the user is obscured from a thermostat's gesture sensor, turn up the volume on a media player when the user is in a different room than the media player, or pause a television program when the user's gesture is obscured by a chair, couch, or other obstruction.

20 Claims, 8 Drawing Sheets

(51) Int. Cl.
*G01S 13/04* (2006.01)
*G06K 9/00* (2006.01)
*G01S 7/40* (2006.01)
*G01S 13/72* (2006.01)
*G01S 13/86* (2006.01)
*G01S 13/46* (2006.01)

(56) References Cited

U.S. PATENT DOCUMENTS

| | | |
|---|---|---|
| 4,700,044 A | 10/1987 | Hokanson et al. |
| 4,795,998 A | 1/1989 | Dunbar et al. |
| 5,298,715 A | 3/1994 | Chalco et al. |
| 5,341,979 A | 8/1994 | Gupta |
| 5,798,798 A | 8/1998 | Rector et al. |
| 6,313,825 B1 | 11/2001 | Gilbert |
| 6,386,757 B1 | 5/2002 | Konno |
| 6,513,970 B1 | 2/2003 | Tabata et al. |
| 6,543,668 B1 | 4/2003 | Fujii et al. |
| 7,317,416 B2 | 1/2008 | Flom et al. |
| 7,348,285 B2 | 3/2008 | Dhawan et al. |
| 7,421,061 B2 | 9/2008 | Boese et al. |
| 7,677,729 B2 | 3/2010 | Vilser et al. |
| 7,691,067 B2 | 4/2010 | Westbrook et al. |
| 7,698,154 B2 | 4/2010 | Marchosky |
| 8,062,220 B2 | 11/2011 | Kurtz et al. |
| 8,169,404 B1 | 5/2012 | Boillot |
| 8,289,185 B2 | 10/2012 | Alonso |
| 8,301,232 B2 | 10/2012 | Albert et al. |
| 8,475,367 B1 | 7/2013 | Yuen et al. |
| 8,560,972 B2 | 10/2013 | Wilson |
| 8,655,004 B2 | 2/2014 | Prest et al. |
| 8,700,137 B2 | 4/2014 | Albert |
| 8,758,020 B2 | 6/2014 | Burdea et al. |
| 8,759,713 B2 | 6/2014 | Sheats |
| 8,764,651 B2 | 7/2014 | Tran |
| 8,790,257 B2 | 7/2014 | Libbus et al. |
| 9,141,194 B1 | 9/2015 | Keyes et al. |
| 2002/0170897 A1 | 11/2002 | Hall |
| 2003/0100228 A1 | 5/2003 | Bungo et al. |
| 2003/0119391 A1 | 6/2003 | Swallow et al. |
| 2004/0009729 A1 | 1/2004 | Hill et al. |
| 2006/0035554 A1 | 2/2006 | Glaser et al. |
| 2006/0040739 A1 | 2/2006 | Wells |
| 2006/0166620 A1 | 7/2006 | Sorensen |
| 2006/0258205 A1 | 11/2006 | Locher et al. |
| 2007/0118043 A1 | 5/2007 | Oliver et al. |
| 2007/0161921 A1 | 7/2007 | Rausch |
| 2007/0176821 A1 | 8/2007 | Flom et al. |
| 2007/0197878 A1 | 8/2007 | Shklarski |
| 2007/0210074 A1 | 9/2007 | Maurer et al. |
| 2008/0065291 A1 | 3/2008 | Breed |
| 2008/0168396 A1 | 7/2008 | Matas et al. |
| 2008/0233822 A1 | 9/2008 | Swallow et al. |
| 2008/0282665 A1 | 11/2008 | Speleers |
| 2008/0291158 A1 | 11/2008 | Park et al. |
| 2008/0320419 A1 | 12/2008 | Matas et al. |
| 2009/0018408 A1 | 1/2009 | Ouchi et al. |
| 2009/0033585 A1 | 2/2009 | Lang |
| 2009/0053950 A1 | 2/2009 | Surve |
| 2009/0056300 A1 | 3/2009 | Chung et al. |
| 2009/0058820 A1 | 3/2009 | Hinckley |
| 2009/0115617 A1 | 5/2009 | Sano et al. |
| 2009/0270690 A1 | 10/2009 | Roos et al. |
| 2009/0288762 A1 | 11/2009 | Wolfel |
| 2010/0065320 A1 | 3/2010 | Urano |
| 2010/0071205 A1 | 3/2010 | Graumann et al. |
| 2010/0094141 A1 | 4/2010 | Puswella |
| 2010/0201586 A1 | 8/2010 | Michalk |
| 2010/0205667 A1 | 8/2010 | Anderson et al. |
| 2010/0208035 A1 | 8/2010 | Pinault et al. |
| 2010/0225562 A1 | 9/2010 | Smith |
| 2010/0281438 A1 | 11/2010 | Latta et al. |
| 2010/0313414 A1 | 12/2010 | Sheats |
| 2010/0324384 A1 | 12/2010 | Moon et al. |
| 2010/0325770 A1 | 12/2010 | Chung et al. |
| 2011/0003664 A1 | 1/2011 | Richard |
| 2011/0073353 A1 | 3/2011 | Lee et al. |
| 2011/0093820 A1 | 4/2011 | Zhang et al. |
| 2011/0181509 A1 | 7/2011 | Rautiainen et al. |
| 2011/0181510 A1 | 7/2011 | Hakala et al. |
| 2011/0197263 A1 | 8/2011 | Stinson, III |
| 2011/0202404 A1 | 8/2011 | van der Riet |
| 2011/0213218 A1 | 9/2011 | Weiner et al. |
| 2011/0221666 A1 | 9/2011 | Newton et al. |
| 2011/0234492 A1 | 9/2011 | Ajmera et al. |
| 2011/0239118 A1 | 9/2011 | Yamaoka et al. |
| 2011/0245688 A1 | 10/2011 | Arora et al. |
| 2011/0303341 A1 | 12/2011 | Meiss et al. |
| 2011/0318985 A1 | 12/2011 | McDermid |
| 2012/0047468 A1 | 2/2012 | Santos et al. |
| 2012/0092284 A1 | 4/2012 | Rofougaran et al. |
| 2012/0123232 A1 | 5/2012 | Najarian et al. |
| 2012/0144934 A1 | 6/2012 | Russell et al. |
| 2012/0174736 A1 | 7/2012 | Wang et al. |
| 2012/0193801 A1 | 8/2012 | Gross et al. |
| 2012/0248093 A1 | 10/2012 | Ulrich et al. |
| 2012/0254810 A1 | 10/2012 | Heck et al. |
| 2012/0280900 A1 | 11/2012 | Wang et al. |
| 2012/0310665 A1 | 12/2012 | Xu et al. |
| 2013/0053653 A1 | 2/2013 | Cuddihy et al. |
| 2013/0102217 A1 | 4/2013 | Jeon |
| 2013/0132931 A1 | 5/2013 | Bruns et al. |
| 2013/0150735 A1 | 6/2013 | Cheng |
| 2013/0194173 A1 | 8/2013 | Zhu et al. |
| 2013/0196716 A1 | 8/2013 | Muhammad |
| 2013/0278499 A1 | 10/2013 | Anderson |
| 2013/0283203 A1 | 10/2013 | Batraski et al. |
| 2013/0345569 A1 | 12/2013 | Mestha et al. |
| 2014/0005809 A1 | 1/2014 | Frei et al. |
| 2014/0051941 A1 | 2/2014 | Messerschmidt |
| 2014/0072190 A1 | 3/2014 | Wu et al. |
| 2014/0073486 A1 | 3/2014 | Ahmed et al. |
| 2014/0073969 A1 | 3/2014 | Zou et al. |
| 2014/0081100 A1 | 3/2014 | Muhsin et al. |
| 2014/0095480 A1 | 4/2014 | Marantz et al. |
| 2014/0121540 A1 | 5/2014 | Raskin |
| 2014/0139616 A1 | 5/2014 | Pinter et al. |
| 2014/0143678 A1 | 5/2014 | Mistry et al. |
| 2014/0191939 A1 | 7/2014 | Penn et al. |
| 2014/0200416 A1 | 7/2014 | Kashef et al. |
| 2014/0244277 A1 | 8/2014 | Krishna Rao et al. |
| 2014/0246415 A1 | 9/2014 | Wittkowski |
| 2014/0253709 A1 | 9/2014 | Bresch et al. |
| 2014/0275854 A1 | 9/2014 | Venkatraman et al. |
| 2014/0297006 A1 | 10/2014 | Sadhu |
| 2014/0306936 A1 | 10/2014 | Dahl et al. |
| 2014/0316261 A1 | 10/2014 | Lux et al. |
| 2014/0357369 A1 | 12/2014 | Callens et al. |
| 2015/0002391 A1 | 1/2015 | Chen |
| 2015/0026815 A1 | 1/2015 | Barrett |
| 2015/0029050 A1 | 1/2015 | Driscoll et al. |
| 2015/0046183 A1 | 2/2015 | Cireddu |
| 2015/0077282 A1 | 3/2015 | Mohamadi |
| 2015/0085060 A1 | 3/2015 | Fish et al. |
| 2015/0091858 A1 | 4/2015 | Rosenberg et al. |
| 2015/0100328 A1 | 4/2015 | Kress et al. |
| 2015/0112606 A1 | 4/2015 | He et al. |
| 2015/0133017 A1 | 5/2015 | Liao et al. |
| 2015/0145805 A1 | 5/2015 | Liu |
| 2015/0162729 A1 | 6/2015 | Reversat et al. |
| 2015/0268027 A1 | 9/2015 | Gerdes |
| 2015/0277569 A1 | 10/2015 | Sprenger et al. |
| 2015/0332075 A1 | 11/2015 | Burch |
| 2015/0346820 A1 | 12/2015 | Poupyrev et al. |
| 2015/0375339 A1 | 12/2015 | Sterling et al. |
| 2016/0018948 A1 | 1/2016 | Parvarandeh et al. |
| 2016/0041617 A1 | 2/2016 | Poupyrev |
| 2016/0041618 A1 | 2/2016 | Poupyrev |
| 2016/0054792 A1 | 2/2016 | Poupyrev |
| 2016/0054803 A1 | 2/2016 | Poupyrev |
| 2016/0054804 A1* | 2/2016 | Gollakata ............ G06F 3/017 345/156 |
| 2016/0055201 A1 | 2/2016 | Poupyrev et al. |
| 2016/0103500 A1 | 4/2016 | Hussey et al. |

(56) References Cited

U.S. PATENT DOCUMENTS

| | | |
|---|---|---|
| 2016/0106328 A1 | 4/2016 | Mestha et al. |
| 2016/0145776 A1 | 5/2016 | Roh |
| 2016/0249698 A1 | 9/2016 | Berzowska et al. |
| 2016/0282988 A1 | 9/2016 | Poupyrev |
| 2016/0283101 A1 | 9/2016 | Schwesig et al. |
| 2016/0284436 A1 | 9/2016 | Fukuhara et al. |
| 2016/0320852 A1 | 11/2016 | Poupyrev |
| 2016/0320853 A1 | 11/2016 | Lien et al. |
| 2016/0320854 A1 | 11/2016 | Lien et al. |
| 2016/0321428 A1 | 11/2016 | Rogers |
| 2016/0338599 A1 | 11/2016 | DeBusschere et al. |
| 2016/0345638 A1 | 12/2016 | Robinson et al. |
| 2016/0349845 A1 | 12/2016 | Poupyrev et al. |

FOREIGN PATENT DOCUMENTS

| | | |
|---|---|---|
| WO | WO 9001895 | 3/1990 |
| WO | WO-0127855 | 4/2001 |
| WO | WO-02082999 | 10/2002 |
| WO | WO-2009032073 | 3/2009 |
| WO | WO 2012026013 | 3/2012 |
| WO | WO-2013186696 | 12/2013 |
| WO | WO-2013191657 | 12/2013 |
| WO | WO 2013192166 | 12/2013 |
| WO | WO-2014116968 | 7/2014 |
| WO | WO 2014124520 | 8/2014 |
| WO | WO-2014136027 | 9/2014 |
| WO | WO-2014138280 | 9/2014 |
| WO | WO-2014160893 | 10/2014 |

OTHER PUBLICATIONS

"Cardiio", Retrieved From: <http://www.cardiio.com/> Apr. 15, 2015 App Information Retrieved From: <https://itunes.apple.com/us/app/cardiio-touchless-camera-pulse/id542891434?ls=1&mt=8>Apr. 15, 2015, Feb. 24, 2015, 6 pages.

Balakrishnan,"Detecting Pulse from Head Motions in Video", In Proceedings: CVPR '13 Proceedings of the 2013 IEEE Conference on Computer Vision and Pattern Recognition Available at: <http://people.csail.mit.edu/mrub/vidmag/papers/Balakrishnan_Detecting_Pulse_from_2013_CVPR_paper.pdf>, Jun. 23, 2013, 8 pages.

Couderc,"Detection of Atrial Fibrillation using Contactless Facial Video Monitoring", In Proceedings: Heart Rhythm Society, vol. 12, Issue 1 Available at: <http://www.heartrhythmjournal.com/article/S1547-5271(14)00924-2/pdf>, Jan. 2015, 7 pages.

Poh,"A Medical Mirror for Non-contact Health Monitoring", In Proceedings: ACM SIGGRAPH Emerging Technologies Available at: <http://affect.media.mit.edu/pdfs/11.Poh-etal-SIGGRAPH.pdf>, 2011, 1 page.

Poh,"Non-contact, Automated Cardiac Pulse Measurements Using Video Imaging and Blind Source Separation.", In Proceedings: Optics Express, vol. 18, No. 10 Available at: <http://www.opticsinfobase.org/view_article.cfm?gotourl=http%3A%2F%2Fwww%2Eopticsinfobase%2Eorg%2FDirectPDFAccess%2F77B04D55%2DBC95%2D6937%2D5BAC49A426378C02%5F199381%2Foe%2D18%2D10%2D10762%2Ep, May 7, 2010, 13 pages.

Wang,"Exploiting Spatial Redundancy of Image Sensor for Motion Robust rPPG", In Proceedings: IEEE Transactions on Biomedical Engineering, vol. 62, Issue 2, Jan. 19, 2015, 11 pages.

"International Search Report and Written Opinion", Application No. PCT/US2015/043963, Nov. 24, 2015, 16 pages.

"International Search Report and Written Opinion", Application No. PCT/US2015/043949, Dec. 1, 2015, 18 pages.

Zhadobov,"Millimeter-wave Interactions with the Human Body: State of Knowledge and Recent Advances", International Journal of Microwave and Wireless Technologies, Mar. 1, 2011, 11 pages.

He, "A Continuous, Wearable, and Wireless Heart Monitor Using Head Ballistocardiogram (BCG) and Head Electrocardiogram (ECG) with a Nanowatt ECG Heartbeat Detection Circuit", In Proceedings: Thesis, Department of Electrical Engineering and Computer Science, Massachusetts Institute of Technology Available at: <http://dspace.mit.edu/handle/1721.1/79221>, Feb. 2013, 137 pages.

Nakajima, et al., "Development of Real-Time Image Sequence Analysis for Evaluating Posture Change and Respiratory Rate of a Subject in Bed", In Proceedings: Physiological Measurement, vol. 22, No. 3, Retrieved From: <http://iopscience.iop.org/0967-3334/22/3/401/pdf/0967-3334_22_3_401.pdf> Feb. 27, 2015, Aug. 2001, 8 pages.

"International Search Report and Written Opinion", Application No. PCT/US2015/050903, Feb. 19, 2016, 18 pages.

"Non-Final Office Action", U.S. Appl. No. 14/504,038, Feb. 26, 2016, 22 pages.

Pu,"Whole-Home Gesture Recognition Using Wireless Signals", MobiCom '13 Proceedings of the 19th annual international conference on Mobile computing & networking, Aug. 27, 2013, 12 pages.

"Final Office Action", U.S. Appl. No. 14/504,038, Sep. 27, 2016, 23 pages.

"International Search Report and Written Opinion", Application No. PCT/US2016/032307, Aug. 25, 2016, 13 pages.

"International Search Report and Written Opinion", Application No. PCT/US2016/029820, Jul. 15, 2016, 14 pages.

"Non-Final Office Action", U.S. Appl. No. 14/666,155, Aug. 24, 2016, 9 pages.

"Non-Final Office Action", U.S. Appl. No. 14/681,625, Aug. 12, 2016, 9 pages.

"Restriction Requirement", U.S. Appl. No. 14/666,155, Jul. 22, 2016, 5 pages.

"The Instant Blood Pressure app estimates blood pressure with your smartphone and our algorithm", Retrieved at : http://www.instantbloodpressure.com/—Jun. 23, 2016, 6 pages.

Espina,"Wireless Body Sensor Network for Continuous Cuff-less Blood Pressure Monitoring", International Summer School on Medical Devices and Biosensors, 2006, Sep. 2006, 5 pages.

"Corrected Notice of Allowance", U.S. Appl. No. 14/312,486, Oct. 28, 2016, 4 pages.

"International Search Report and Written Opinion", Application No. PCT/US2016/033342, Oct. 27, 2016, 20 pages.

"Non-Final Office Action", U.S. Appl. No. 14/518,863, Oct. 14, 2016, 16 pages.

"Non-Final Office Action", U.S. Appl. No. 14/930,220, Sep. 14, 2016, 15 pages.

"Notice of Allowance", U.S. Appl. No. 14/312,486, Oct. 7, 2016, 15 pages.

"Notice of Allowance", U.S. Appl. No. 14/504,061, Sep. 12, 2016, 7 pages.

"Pre-Interview Communication", U.S. Appl. No. 14/513,875, Oct. 21, 2016, 3 pages.

Matthews,"Venous Pulse", Retrieved at: http://www.rjmatthewsmd.com/Definitions/venous_pulse.htm—on Nov. 30, 2016, Apr. 13, 2013, 7 pages.

Pu, "Gesture Recognition Using Wireless Signals", Oct. 2014, pp. 15-18.

"Corrected Notice of Allowance", U.S. Appl. No. 14/312,486, Jan. 23, 2017, 4 pages.

"Corrected Notice of Allowance", U.S. Appl. No. 14/504,061, Dec. 27, 2016, 2 pages.

"Final Office Action", U.S. Appl. No. 14/681,625, Dec. 7, 2016, 10 pages.

"International Search Report and Written Opinion", Application No. PCT/US2016/042013, Oct. 26, 2016, 12 pages.

"Non-Final Office Action", U.S. Appl. No. 14/504,121, Jan. 9, 2017, 13 pages.

"Life:X Lifestyle eXplorer", Retrieved from <https://web.archive.org/web/20150318093841/http://research.microsoft.com/en-us/projects/lifex>, Feb. 3, 2017, 2 pages.

"Non-Final Office Action", U.S. Appl. No. 14/504,139, Jan. 27, 2017, 10 pages.

"Non-Final Office Action", U.S. Appl. No. 14/666,155, Feb. 3, 2017, 12 pages.

"Non-Final Office Action", U.S. Appl. No. 14/959,799, Jan. 27, 2017, 10 pages.

(56) References Cited

OTHER PUBLICATIONS

"Notice of Allowance", U.S. Appl. No. 14/930,220, Feb. 2, 2017, 8 pages.
"Pre-Interview Communication", U.S. Appl. No. 14/494,863, Jan. 27, 2017, 5 pages.
"The Dash smart earbuds play back music, and monitor your workout", Retrieved from <http://newatlas.com/bragi-dash-tracking-earbuds/30808/>, Feb. 13, 2014, 3 pages.
Palese,"The Effects of Earphones and Music on the Temperature Measured by Infrared Tympanic Thermometer: Preliminary Results", ORL -head and neck nursing: official journal of the Society of Otorhinolaryngology and Head-Neck Nurses 32.2, 2013, pp. 8-12.

* cited by examiner

Fig. 8

NON-LINE-OF-SIGHT RADAR-BASED GESTURE RECOGNITION

PRIORITY APPLICATION

This application is a non-provisional of and claims priority under 35 U.S.C. §119(e) to U.S. Patent Application Ser. No. 62/059,099, titled "Non-Line-of-Sight Radar-Based Gesture Recognition," and filed on Oct. 2, 2014, the disclosure of which is incorporated by reference herein in its entirety.

BACKGROUND

As smart devices proliferate in homes, automobiles, and offices, the need to seamlessly and intuitively control these devices becomes increasingly important. For example, users desire to quickly and easily control their media players, televisions, and climate devices from wherever they happen to be. Current techniques for controlling smart devices, however, fail to provide seamless and intuitive control, instead relying on touch screens, hand-held remote controls, and clumsy audio interfaces.

This background description is provided for the purpose of generally presenting the context of the disclosure. Unless otherwise indicated herein, material described in this section is neither expressly nor impliedly admitted to be prior art to the present disclosure or the appended claims.

SUMMARY

This document describes techniques and devices for non-line-of-sight radar-based gesture recognition. Through use of the techniques and devices described herein, users may control their devices through in-the-air gestures, even when those gestures are not within line-of-sight of their device's sensors. Thus, the techniques enable users to control their devices in many situations in which control is desired but conventional techniques do permit effective control, such as to turn the temperature down in a room when the user is obscured from a thermostat's gesture sensor, turn up the volume on a media player when the user is in a different room than the media player, or pause a television program when the user's gesture is obscured by a chair, couch, or other obstruction.

This summary is provided to introduce simplified concepts relating to non-line-of-sight radar-based gesture recognition, which is further described below in the Detailed Description. This summary is not intended to identify essential features of the claimed subject matter, nor is it intended for use in determining the scope of the claimed subject matter.

BRIEF DESCRIPTION OF THE DRAWINGS

Embodiments of techniques and devices for non-line-of-sight radar-based gesture recognition are described with reference to the following drawings. The same numbers are used throughout the drawings to reference like features and components.

DETAILED DESCRIPTION

Overview

This document describes techniques and devices enabling non-line-of-sight radar-based gesture recognition. These techniques and devices enable greater control of smart devices through recognizing gestures when those gestures are made without being within line-of-sight of a smart device's sensors.

Consider, for example, a case where a user has many smart devices in his home. Assume that to control these devices he has numerous handheld remote controls; one for each device. Controlling these various smart devices is impractical due to the number of remote controls needed. Further, even if the user had one remote control capable of controlling multiple smart devices, he would still not be able to control all of multiple devices whenever he was not within line-of-sight of all of these various devices. And, even in the uncommon event of being in line-of-sight to many devices at once, the user still needs to carry around a remote control.

Consider other conventional ways in which to control smart devices, such as audio interfaces and line-of-sight cameras. Audio interfaces often fail to understand a user's intent and require the user to interrupt his or her ongoing conversations. Line-of-sight cameras, while allowing a user to forgo carrying a remote control in some cases, require line-of-sight and also can fail to provide robust and consistent gesture recognition. These are but three of many example controllers that fail to provide seamless and intuitive control.

In contrast, consider a case where a user is standing in her kitchen and desires to pause her television that is in her living room, turn off her microwave because her dinner is getting too hot, and turn up the heat in her home. Assume that the user's hands are blocked from her microwave by some hanging pots and pans and that her thermostat and television are within other rooms. The techniques described herein enable her to control all three of these devices, even though two are in other rooms and the third is obscured by various objects. None of these have line-of-sight to her, yet she can make a gesture to control each and every one of these three different devices seamlessly and intuitively.

This is but one way in which non-line-of-sight radar-based gesture recognition can be performed. This document now turns to an example environment, after which non-line-of-sight gesture recognition systems, example methods, and an example computing system are described.

Example Environment

Figure 1:
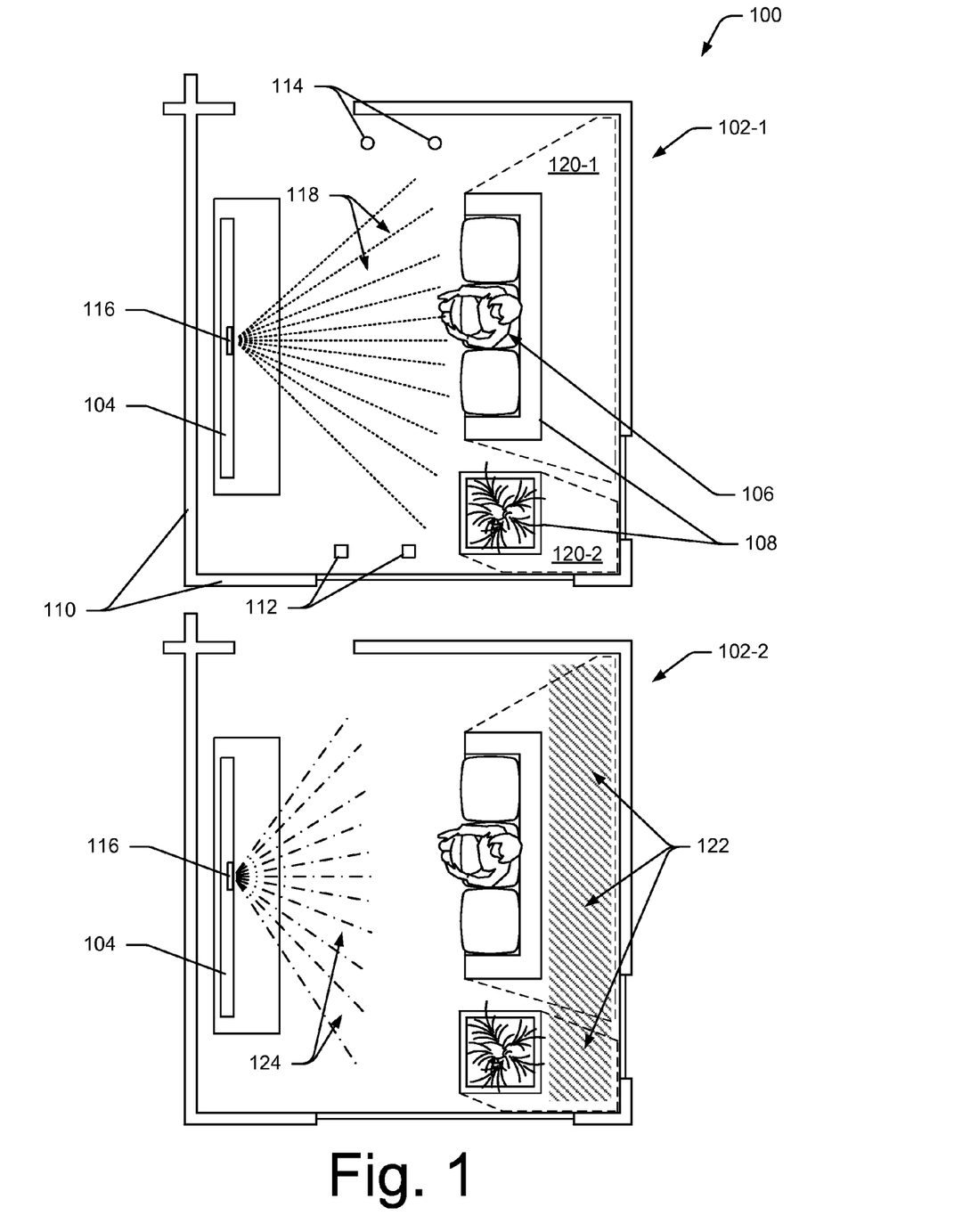
FIG. 1 illustrates an example environment in which non-line-of-sight radar-based gesture recognition can be implemented, including though use of direct and reflected radar fields.

FIG. 1 is an illustration of an example environment 100 in which techniques enabling non-line-of-sight radar-based gesture recognition can be performed. Environment 100 includes a room 102, a smart device 104, and a user 106. Room 102 includes obstructions 108, walls 110, a floor 112 (shown with squares), and a ceiling 114 (transparent in top-down view, show with circles), which are described in more detail below. Room 102 is shown in two identical illustrations (102-1 and 102-2) with the exception of one having a direct radar field and another having a reflected radar field, as noted below.

Smart device 104 includes non-line-of-sight gesture recognition system 116 (NLOS system 116), which provides a direct radar field 118. Direct radar field 118 does not have line-of-sight to some portions of room 102, here volumes 120. A first volume 120-1 does not have line-of-sight to NLOS system 116 due to couch 108-1, which is one of obstructions 108. A second volume 120-2 does not have line-of-sight to NLOS system 116 due to planter box 108-2, which is another of obstructions 108.

NLOS recognition system 116 is also capable of providing a reflected radar field 122 effective to enable recognition of gestures within some or all of volumes 120 in which direct line-of-sight is not available. This reflected radar field 122 is shown provided through radar transmission lines 124, though additional description of transmission lines is provided elsewhere herein. For visual clarity radar fields 118 and 122 are shown separately, though both radar fields can be used together.

While not shown in FIG. 1, NLOS system 116 can also provide a penetration radar field. This field is configured to penetrate various materials, such as wool, cotton, nylon, or leather, but reflect from human tissue, thereby further enabling recognition of gestures that are partially or fully not in line-of-sight or otherwise obscured from NLOS system 116.

Figure 2:
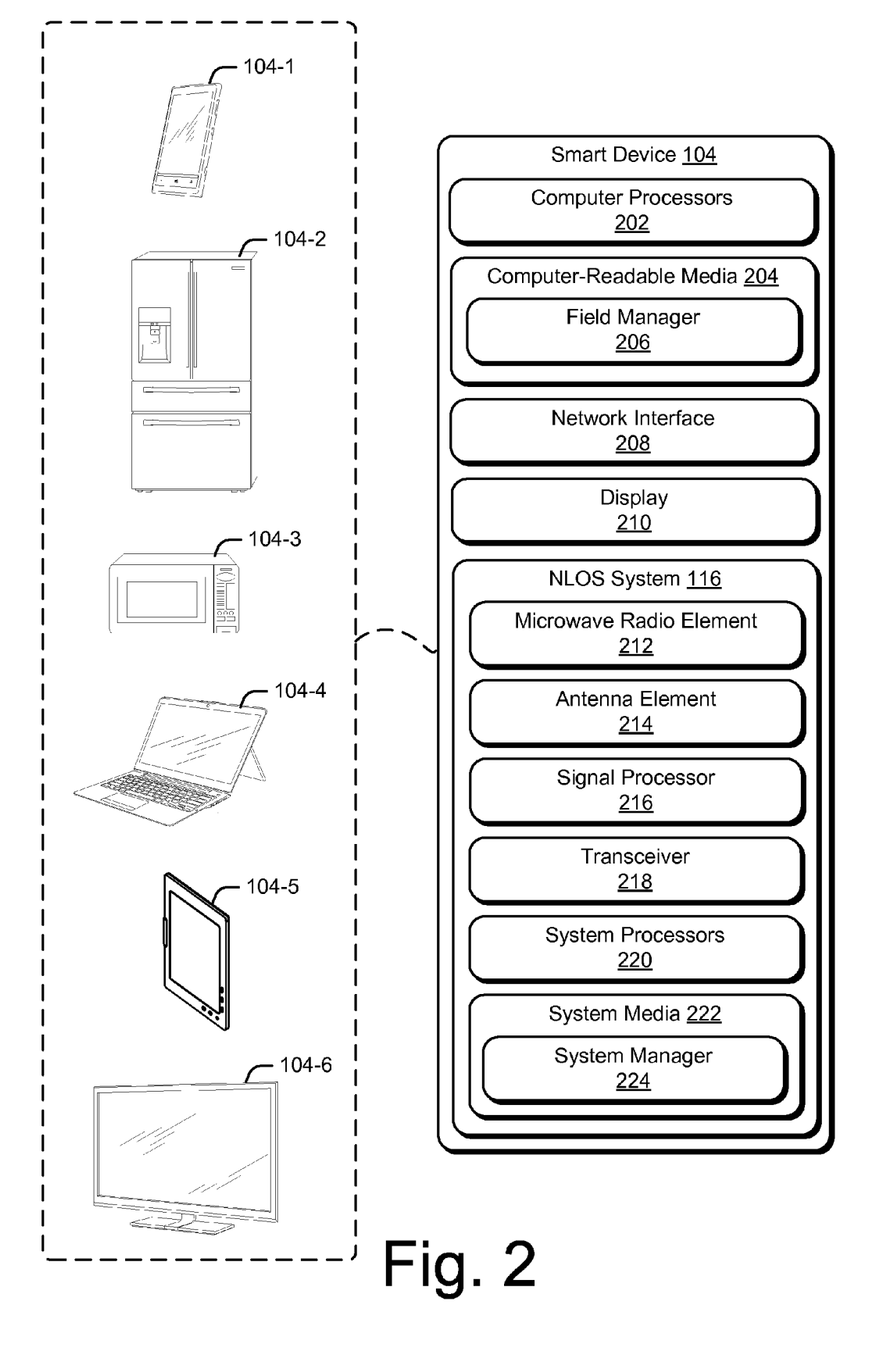
FIG. 2 illustrates the smart device of FIG. 1 in greater detail.

In more detail, consider FIG. 2, which illustrates smart device 104. Smart device 104 includes one or more computer processors 202 and computer-readable media 204 (e.g., memory media and storage media). Applications and/or an operating system (not shown) embodied as computer-readable instructions on computer-readable media 204 can be executed by processors 202 to provide some of the functionalities described herein. Computer-readable media 204 also includes field manager 206 (described below).

Smart device 104 may also include network interfaces 208 for communicating data over wired, wireless, or optical networks. By way of example and not limitation, network interface 208 may communicate data over a local-area-network (LAN), a wireless local-area-network (WLAN), a personal-area-network (PAN), a wide-area-network (WAN), an intranet, the Internet, a peer-to-peer network, point-to-point network, a mesh network, and the like. Smart device 104 may also include a display 210, though this is not required.

Smart device 104 also includes or has access to NLOS system 116, as noted above, which is configured to provide radar fields by which to sense gestures. To enable this, NLOS system 116 includes a microwave radio element 212, an antenna element 214, and a signal processor 216. Generally, microwave radio element 212 is configured to provide a radar field having a direct radar field and a reflected radar field as noted above, through a penetration radar field may also be included. While examples shown herein generally show one NLOS system 116 per device, multiples can be used, thereby increasing coverage of a volume (e.g., room 102), as well as a number, complexity, accuracy, resolution, and robust recognition of gestures.

Microwave radio element 212 can be configured to emit one or multiple sets of continuously modulated radiation, ultra-wideband radiation, or sub-millimeter-frequency radiation. Microwave radio element 212, in some cases, is configured to form radiation in beams, the beams aiding antenna element 214 and signal processor 216 to determine which of the beams are interrupted, and thus locations of interactions (e.g., by a hand) within the radar field. In more detail, microwave radio element 212 can be configured to emit microwave radiation in a 1 GHz to 300 GHz range, as well as 57 GHz to 63 GHz, to provide the radar field. This range affects antenna element 214's ability to sense interactions, such as to track locations of two or more targets to a resolution of about two to about 25 millimeters. Microwave radio element 212 can be configured, along with other entities of NLOS system 116, to have a relatively fast update rate, which can aid in resolution of the interactions. By selecting particular frequencies, NLOS system 116 can operate to provide a direct radar field to reflect from line-of-sight gestures, a reflected radar field to reflect first from some object or objects and then from non-line-of-sight gestures, and/or a penetration radar field to penetrate clothing and similar materials while reflecting from human tissue.

Antenna element 214 is configured to receive reflections of, or sense interactions in, the radar field, and signal processor 216 is configured to process the reflections or sensed interactions in the radar field sufficient to provide gesture data usable to determine a gesture from the sensed interactions. Antenna element 214 can include one or many sensors, such as an array of radiation sensors, the number in the array based on a desired resolution and whether the radar field is direct, reflected, or penetration. Alternately or additionally, antenna element 214 may include one or many antennas, such as an array of antennas, directional or otherwise, coupled with respective radiation sensors and/or signal processor 216.

Further, antenna element 214 or signal processor 216 can be configured to differentiate between interactions in the radar field that are from radar transmissions that are direct, through a material, or after being reflected. Thus, a media player having NLOS system 116 may differentiate between radar reflecting directly from a user's hand to radar that was first bounced off of a ceiling (e.g., a painted, gypsum drywall ceiling) and then reflected off of the user's hand.

The radar field provided by microwave radio element 212 can include one or multiple three-dimensional (3D) volumes, planes, or surfaces (e.g., a surface applied to a user's hand). In each of these cases, antenna element 214 is configured to sense interactions of one or multiple targets (e.g., two hands, fingers of one or two hands, etc.), and signal processor 216 is configured to process the sensed interactions sufficient to provide gesture data usable to determine gestures in three dimensions.

With the provided radar field, such as direct radar field 118 and reflected radar field 124 of FIG. 1, a user may perform complex or simple gestures with a hand or device (e.g., a stylus) that interrupts the field. Example gestures include the many gestures usable with current touch-sensitive displays, such as swipes, two-finger pinch and spread, tap, and so forth. Other gestures are enabled that are complex, or simple but three-dimensional, examples include the many sign-language gestures, e.g., those of American Sign Language (ASL) and other sign languages worldwide. A few of these include an up-and-down fist, which in ASL means "Yes", an open index and middle finger moving to connect to an open thumb, which means "No", a flat hand moving up a step, which means "Advance", a flat and angled hand moving up and down, which means "Afternoon", clenched fingers and open thumb moving to open fingers and an open thumb, which means "taxicab", an index finger moving up in a roughly vertical direction, which means "up", and so forth. These are but a few of many gestures that can be mapped to particular devices or applications, such as the "Advance" gesture to skip to another song being played by a media player through a non-line-of-sight gesture.

Figure 3:
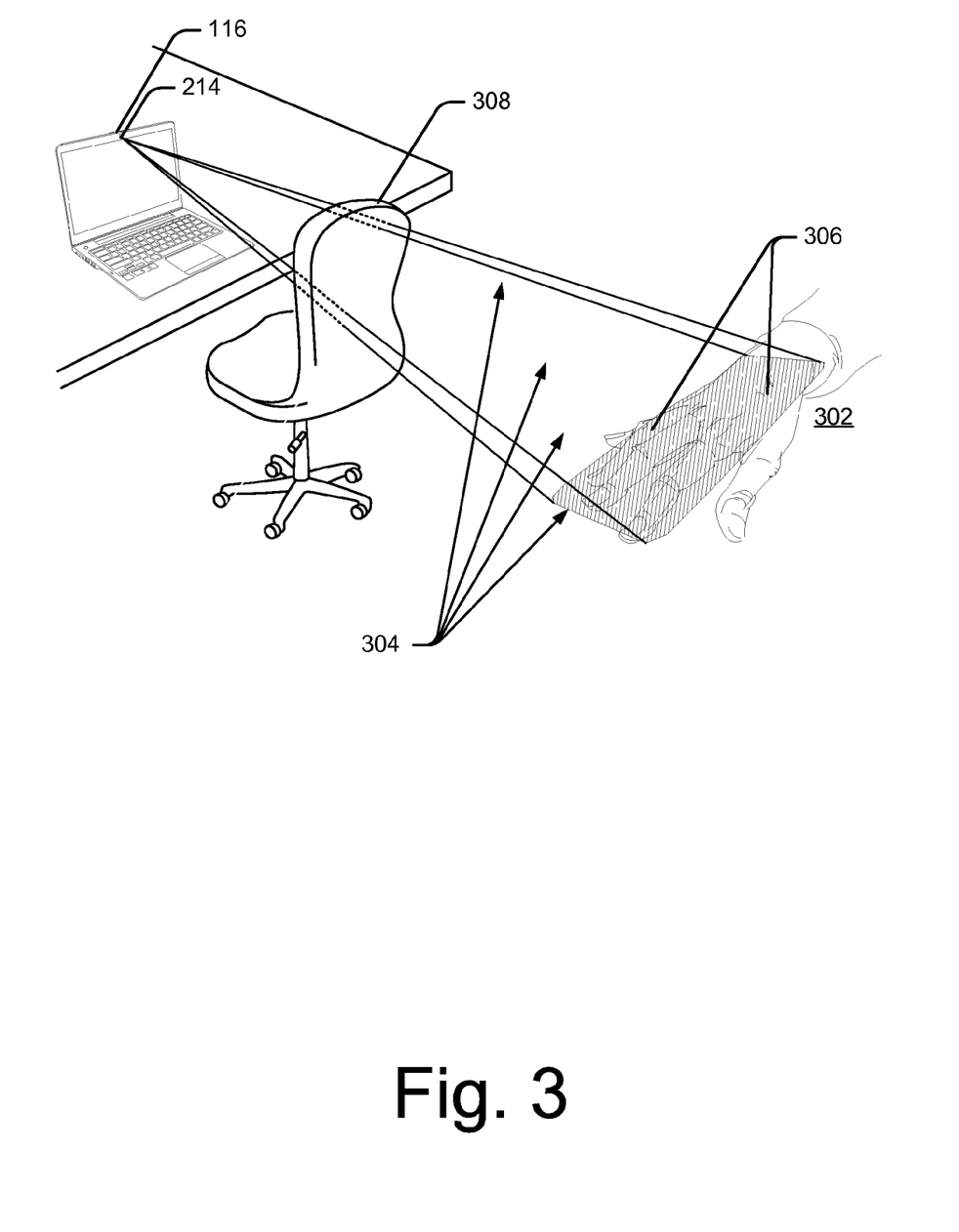
FIG. 3 illustrates an example penetration radar field.

As noted above, NLOS system 116 can provide a penetration radar field capable of penetrating some objects and materials and then reflect off of human tissue. This is illustrated at FIG. 3, which shows hand 302 having a penetration radar field 304 contacting a surface 306 of hand 302. This penetration radar field 304 penetrates chair 308 to then be reflected from surface 306 and received back at antenna element 214 of NLOS system 116. Microwave radio element 212 (not shown) provides penetration radar field 304, while antenna element 214 is configured to receive a reflection caused by an interaction on surface 306 of hand 302 that penetrates and then reflects back through chair 308, at which point signal processor 216 is configured to process the received reflection sufficient to provide gesture data usable to determine a gesture.

Gestures can be associated with various smart devices, such as a device other than smart device 104. To do so, gestures can map to a pre-configured control gesture associated with a control input for an application associated with any of these devices. Thus, a gesture can be set to control the application and/or device based on the gesture itself, rather than first selecting which device or application to which the control is intended. For example, many complex and unique gestures can be recognized by NLOS system 116, thereby permitting precise and/or single-gesture control, even for multiple applications. Mapping these many gestures to various different devices and application permits control, with or without explicitly selecting (usually through a gesture) which device is intended to be controlled.

Smart device 104 is illustrated with various non-limiting example devices: smartphone 104-1, refrigerator 104-2, microwave oven 104-3, laptop 104-4, tablet 104-5, and television 104-6, though other devices may also be used, such as climate control devices (e.g., a thermostat or ceiling fan), wearable devices, desktop computers, netbooks, e-readers, cameras, automotive systems, and so forth.

NLOS system 116 also includes a transceiver 218 configured to transmit gesture data to a remote device, such as in cases where NLOS system 116 is not integrated with smart device 104. Gesture data can be provided in a format usable by the receiving device sufficient to recognize a gesture using the gesture data.

NLOS system 116 may also include one or more system processors 220 and system media 222 (e.g., one or more computer-readable storage media). System media 222 includes system manager 224, which can perform various operations, including determining a gesture based on gesture data from signal processor 216, mapping the determined gesture to a pre-configured control gesture associated with a control input for an application associated with a remote smart device, and causing transceiver 218 to transmit the control input to the remote smart device effective to enable control of the application or device. This is but one of the ways in which the above-mentioned control through NLOS system 116 can be enabled. Note also that while NLOS system 116 is shown integral with smart device 104, it can instead be part of a device having few or no computing capabilities and still provide gesture data to be recognized and/or mapped to a control input. Operations of NLOS system 116, system manager 224, and field manager 206 are provided in greater detail as part of methods 400 and 600 below.

These and other capabilities and configurations, as well as ways in which entities of FIGS. 1-3 act and interact, are set forth in greater detail below. These entities may be further divided, combined, and so on. The environment 100 of FIG. 1 and the detailed illustrations of FIGS. 2 and 3 illustrate some of many possible environments and devices capable of employing the described techniques.

Example Methods

Figure 4:
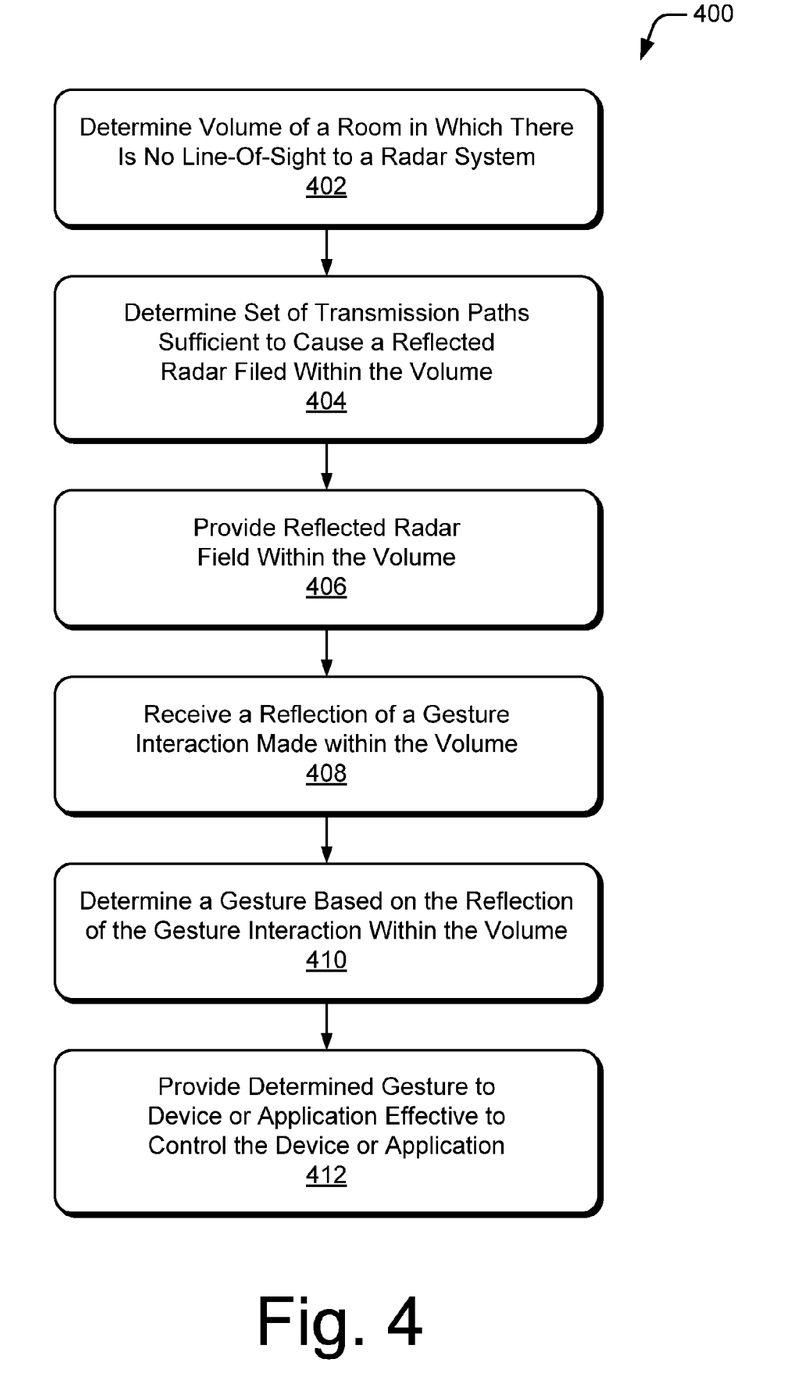
FIG. 4 illustrates an example method enabling non-line-of-sight radar-based gesture recognition using a reflected radar field.
Figure 6:
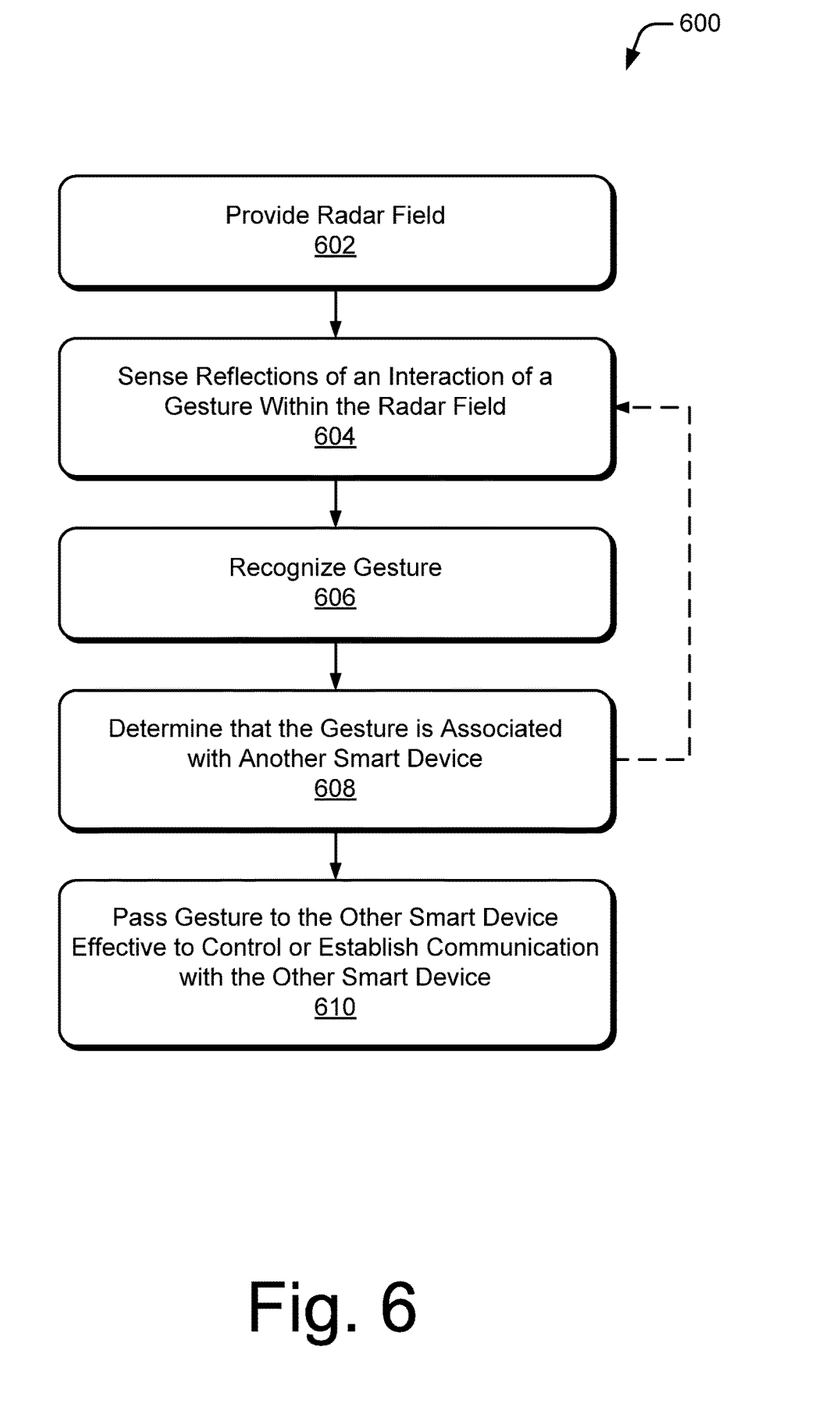
FIG. 6 illustrates an example method enabling non-line-of-sight radar-based gesture recognition effective to control or communicate with a smart device that does not have line-of-sight to a user.

FIGS. 4 and 6 depict methods 400 and 600. Method 400 enables non-line-of-sight radar-based gesture recognition using a reflected radar field, and can be performed separate from or integrated in whole or in part with method 600. Method 600 enables non-line-of-sight radar-based gesture recognition where a direct line-of-sight is not present for one radar system but a gesture is recognized through another radar system and then passed to the other radar system through direct or indirect radar fields.

These methods are shown as sets of operations (or acts) performed but are not necessarily limited to the order or combinations in which the operations are shown herein. Further, any of one or more of the operations may be repeated, combined, reorganized, or linked to provide a wide array of additional and/or alternate methods. In portions of the following discussion reference may be made to environment 100 of FIG. 1 and entities and examples detailed in FIGS. 2, 3, 5, and 7, reference to which is made for example only. The techniques are not limited to performance by one entity or multiple entities operating on one device.

At 402, a volume of a room in which there is no line-of-sight to a radar system is determined. The techniques may determine that there is such a volume in various manners, such as through tracking a moving entity, a camera, bounced (e.g., reflected) radar transmissions, and so forth.

For example, field manager 206 may track, with a radar transmission, a person or animal's movement in the room. If, during a portion of the person or animal's movement field manager 206 does not receive a reflection from the person or animal, field manager 206 may determine, based on the person or animal's projected path or a part of the person or animal no longer trackable (e.g., a person's legs walking behind a couch), that a volume in the room exists where direct line-of-sight is not available.

Field manager 206 may also or instead use a camera or other image sensor, using radar or otherwise. Field manager 206 captures an image using the camera to provide an image of the room from a perspective of NLOS system 116. Field manager 206 then receives or determines (e.g., through sonar or radar reflection) dimensions for the room (e.g., 4 meters wide, 7 meters deep, 3 meters high). With these dimensions and the image of the room, non-imaged but existing floor, wall, or ceiling areas can be determined. With this data, field manager 206 may then determine the volume of the room in which there is no line-of-sight to NLOS system 116.

Further still, field manager 206 may determine non-line-of-sight volumes based on obstructions. Thus, on providing a direct radar field to receive reflections from objects in the room, field manager 206 assumes that regions behind obstructions are likely to be volumes in which a potential gesture may be made, and in any case, these are very likely to part of the room and do not have line-of-sight. As part of this determination obstructions are objects other than floors, walls, or ceilings of the room. Some objects reflect radar and some are those through which radar may pass. Because of this, portions of the objects penetrated by the radar field can reduce the size of the volume.

At 404, a set of transmission paths sufficient to cause a reflected radar field to be provided within at least a portion of the volume is determined by providing radar transmissions from the radar system into the room. As noted in part above, determining a volume in which no line-of-sight is available may include radar reflection, in which case some transmission paths may be known. In many cases, however, while the volume is known the transmission paths to cause a reflected radar field are not yet known.

To determine these transmission path, field manager 206 may iteratively provide radar transmissions and receive reflections from the provided radar transmissions. Some of these radar transmissions may not pass through the determined volume, and thus are not needed. Some others, however, pass through one of the determined volumes and are then correlated with that volume. In still further cases, a person or animal passes through the determined volume and radar transmission are iteratively provided and then, on reflection from the person or animal, correlated to the volume. In so doing various types and frequencies of radar transmissions can be used, including narrow-beam transmission and reflection.

Figure 5:
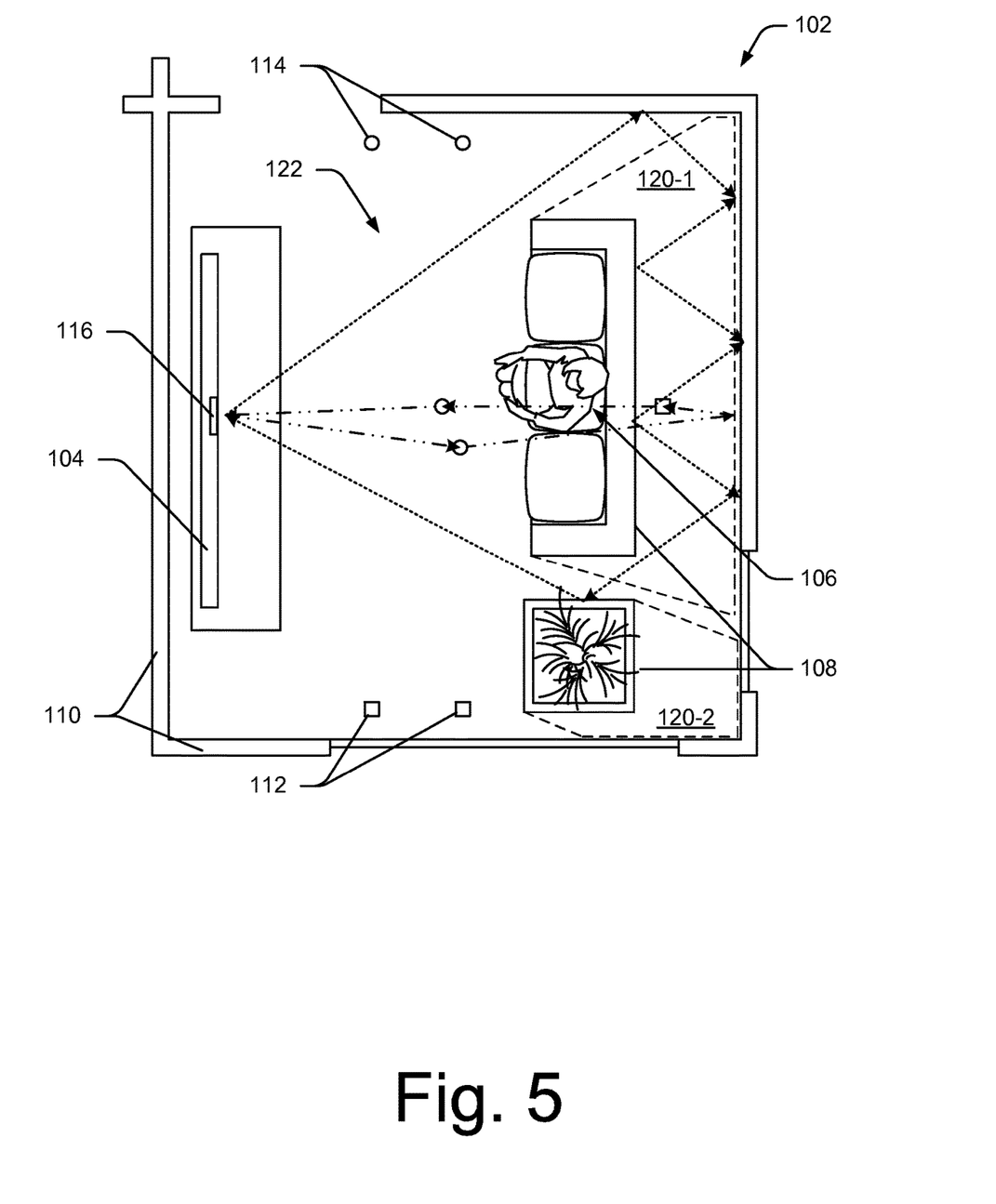
FIG. 5 illustrates a room of FIG. 1, including volumes that do not have line-of-sight to a radar system and transmission paths through which a reflected radar field is provided within those volumes.

By way of example, consider FIG. 5, which illustrates room 102 of FIG. 1, including smart device 104, user 106, obstructions 108, walls 110, floor 112, ceiling 114, NLOS system 116, and volumes 120-1 and 120-2. Two transmission paths are shown, wall-and-object-reflection path 502 and ceiling-and-floor path 504. These illustrate but two of many different transmission paths capable of providing reflection radar field 122 (shown in FIG. 1 and omitted for clarity in FIG. 5).

Wall-and-object-reflection path 502 includes eight portions, each reflecting off of, or resulting from a reflection off of, a wall or object. Thus, path 502 proceeds from NLOS system 116 to one of walls 110, then again off of another of walls 110, then off of a back of couch 108-1, back to the other of walls 110, to couch 108-1, to the other of the walls 110, than off planter box 108-2, and then back to NLOS system 116. Some transmission paths do not result in a reflection returning, and thus can be forgone, while others pass only within volumes that are in line-of-site of NLOS system 116, and can also be forgone. Path 504 proceeds from NLOS system 116 to ceiling 114 (shown reflected at a circle), then to one of walls 110, off floor 112 (shown reflected at a square), off ceiling 114, and then back to NLOS system 116. These two paths 502, 504 provide but two example transmission paths by which NLOS system 116 and field manager 206 may provide a reflected radar field (e.g., 122 of FIG. 1) in a volume in which line-of-sight to NLOS system 116 is not available. As noted, this reflected radar field enables rejection of gestures made within some or all of volumes 120.

At 406, a radar field is provided within the one or more volumes within the room, the radar field including at least the reflected radar field. In some cases, the radar field also includes a direct radar field or a penetration radar field as noted herein. By so doing, a radar field usable to recognize gestures can be provided for gestures that do not have direct line-of-sight from a radar system.

At 408, a reflection of a gesture interaction made within the radar field within the room is received. This reflection enables capture of data about the gesture interaction that can then be used to determine the gesture being made. This reflection can be within a reflected, direct, or penetration radar field as noted above.

At 410, a gesture is determined based on captured data associated with the reflection of the gesture interaction. The gesture determined can be one of many gestures noted above, including those mapping directly to a device or application and a control command, such as to mute a television set.

At 412, the determined gesture is provided to a device or application effective to control the device or application. As part of this provision, field manager 206 may determine to which device or application to send the control, such as by analyzing a map of gestures to various devices and applications.

FIG. 6 illustrates method 600, which enables non-line-of-sight radar-based gesture recognition effective to control or communicate with a smart device that does not have line-of-sight to a user.

At 602, a radar field is provided, such as a field having one or more of a direct, reflected, or penetration radar field, as described above. This radar field can be provided by a radar system that does or does not have line-of-sight to a user making a gesture.

At 604, reflections from an interaction that is within the radar field are sensed through a radar system. This radar system is assumed to have line-of-sight, or is able to compensate for not having line-of-sight, effective to receive reflections from a user. Another smart device, however, which may or may not have a radar system, does not have line-of-sight to the user and is not able to compensate. Thus, both devices may not have line-of-sight to a user but one of those devices is able to sense reflections, such as through a penetration or reflection radar field.

Figure 7:
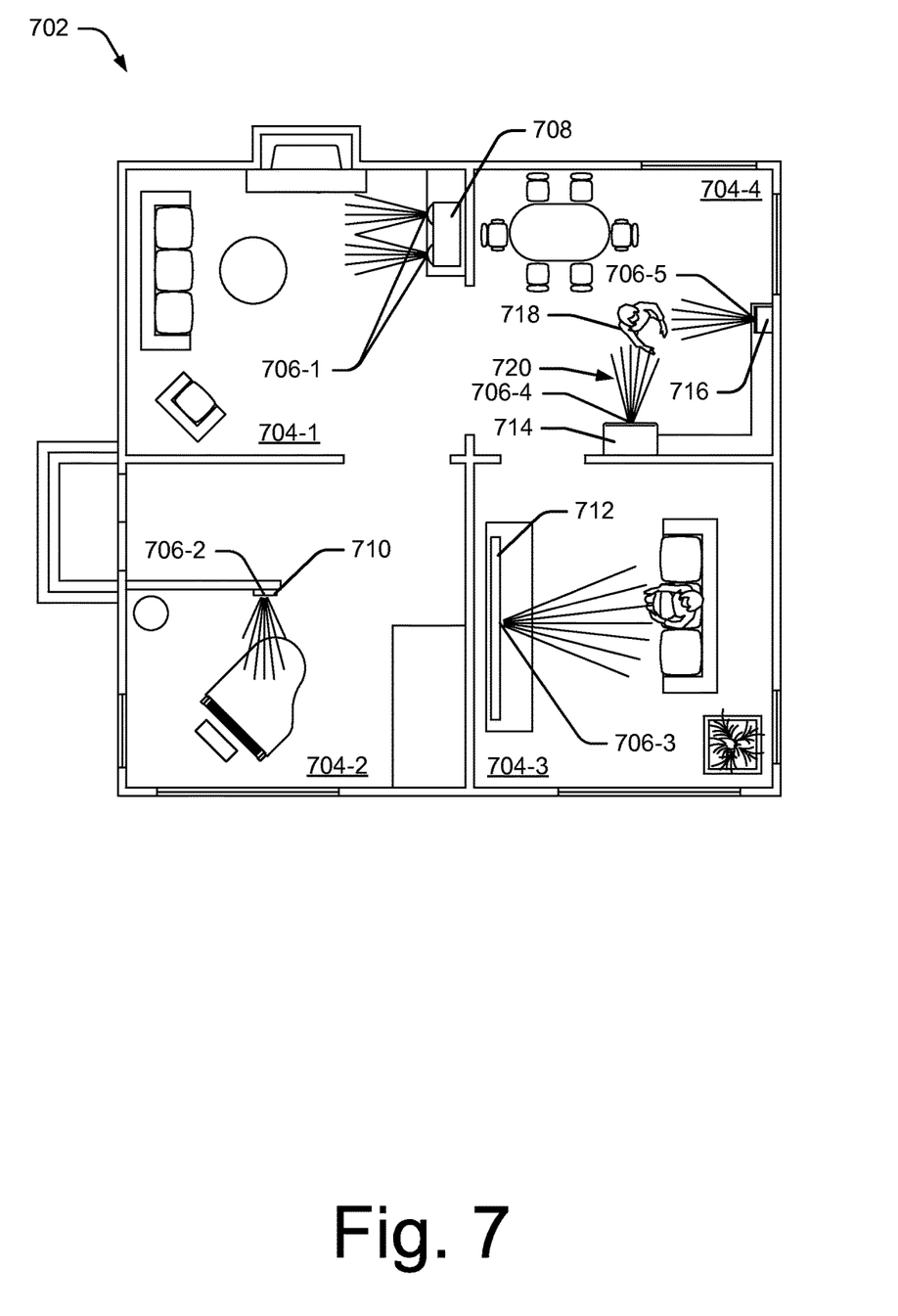
FIG. 7 illustrates a ground floor of a home having multiple radar systems, some of which do not have line-of-sight to a user in the home.

By way of example, consider FIG. 7, which illustrates a ground floor 702 of a home. This home includes four rooms 704, media room 704-1, piano room 704-2, living room 704-3, and kitchen/dining room 704-4. As shown, there are five radar systems 706, a media-player 708's radar system 706-1, a thermostat 710's radar system 706-2, a television 712's radar system 706-3, an oven 714's radar system 706-4, and a microwave-oven 716's radar system 706-5. Multiple scenarios in which the techniques enable gesture recognition without line-of-sight to a smart device intended to be controlled are shown in FIG. 7, such as when user 718 wants to control television 712 while in kitchen 704-4. To do so, field manager 206 receives reflections from user 718 at an NLOS system 116 of one of radar systems 706 that is not in the same room as user 718.

By way of a particular example, assume that user 718 is in kitchen/dining room 704-4 and wants to turn down the heat in the house by controlling thermostat 710, which is in piano room 704-2. To do so, user 718 makes a gesture to turn down the heat while standing in kitchen/dining room 704-4, which, at operation 604, an NLOS system 116 operating in oven 714's radar system 706-4 receives. The gesture is received by receiving user 718's reflection within radar field 720 at an antenna of NLOS system 116.

At 606, a gesture is recognized based on the reflections received. This can be performed at a smart device associated with a radar system at which the reflection is received, or gesture data for the reflection can be received at a smart device intended to be controlled. Thus, field manager 206 or system manager 224 may receive the reflection and pass gesture data for the reflection to other smart devices, such as to all of the other radar systems and/or devices in a home or office. In such a case, the smart devices can determine if the control is intended for them based on the gesture determined from the gesture data, such as having received a prior gesture selecting to control that device or receiving a gesture associated with the smart device.

At 608, the gesture is determined to be associated with (or not associated with) a non-line-of-sight smart device. Generally, field manager 206 may determine that the gesture is associated with a non-line-of-sight smart device by mapping the gesture to a pre-configured gesture intended to establish communication with the non-line-of-sight smart device. In some cases this pre-configured gesture establishes communication with the non-line-of-sight smart device effective to enable a future gesture determined at the smart device to control the non-line-of-sight smart device. In some other cases, field manager 206 may determine that the gesture is associated with the non-line-of-sight smart device by mapping the gesture to a unique gesture. This unique gesture can be of a set of unique gestures uniquely mapped to each of a set of smart devices within some group, such as smart devices on ground floor 702 of FIG. 7.

Continuing the ongoing example of FIG. 7, assume that field manager 206 operating at NLOS system 116 of oven 714's radar system 706-4 recognizes a gesture made by user 718. This gesture may then be determined to indicate control of thermostat 710, after which another gesture is recognized and then determined to be associated with thermostat 710 based on the prior gesture indicating control of thermostat 710 is intended. Assume, for example, that a unique, complex gesture with a closed hand and exposed thumb that moves up and the down is associated with thermostat 710. A second gesture, here assumed to be a non-unique magnitude gesture of a cupped hand moving clockwise or counter-clockwise, indicates to turn up or down something, respectively. Because this second gesture is received soon after the first gesture indicating control of thermostat 710 is intended, it is then recognized by repeating steps of method 600 and then passed (at operation 610) to thermostat 710 effective to turn the heat up or down. This repetition is shown at a dashed arrow in FIG. 6.

Similarly, if the first gesture is associated with control of media player 708, the second gesture indicating to turn up or down, would instead turn up or turn down the volume of media player 708, all without line-of-sight from the intended smart device.

At 610, the gesture is passed to the non-line-of-sight smart device. Thus, the gesture can be passed from one smart device to another smart device effective to enable the gesture to control the non-line-of-sight smart device or establish communication with the non-line-of-sight smart device.

The preceding discussion describes methods relating to non-line-of-sight radar-based gesture recognition. Aspects of these methods may be implemented in hardware (e.g., fixed logic circuitry), firmware, software, manual processing, or any combination thereof. These techniques may be embodied on one or more of the entities shown in FIGS. 1-3, 5, 7, and 8 (computing system 800 is described with reference to FIG. 8 below), which may be further divided, combined, and so on. Thus, these figures illustrate some of the many possible systems or apparatuses capable of employing the described techniques. The entities of these figures generally represent software, firmware, hardware, whole devices or networks, or a combination thereof.

Example Computing System

Figure 8:
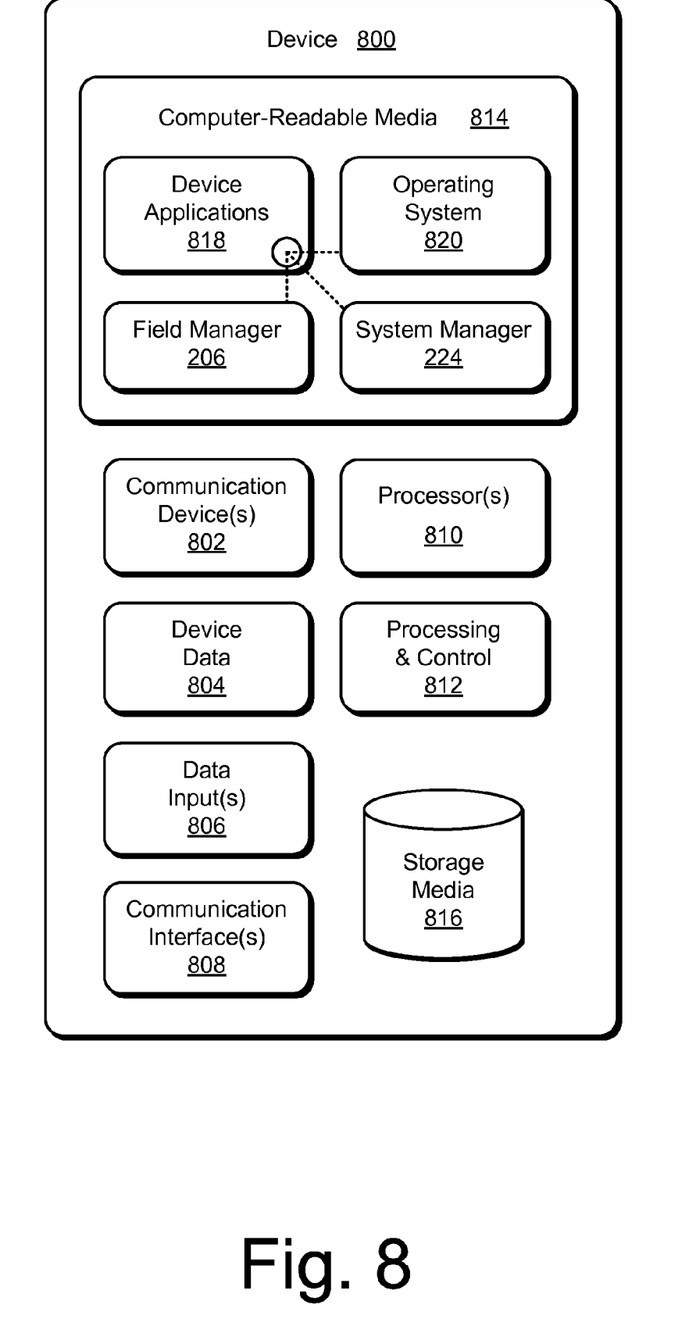
FIG. 8 illustrates an example device embodying, or in which techniques may be implemented that enable use of, non-line-of-sight radar-based gesture recognition.

FIG. 8 illustrates various components of example computing system 800 that can be implemented as any type of client, server, and/or smart device as described with reference to the previous FIGS. 1-7 to implement non-line-of-sight radar-based gesture recognition. In embodiments, computing system 800 can be implemented as one or a combination of a wired and/or wireless wearable device, System-on-Chip (SoC), and/or as another type of device or portion thereof. Computing system 800 may also be associated with a user (e.g., a person) and/or an entity that operates the device such that a device describes logical devices that include users, software, firmware, and/or a combination of devices.

Computing system 800 includes communication devices 802 that enable wired and/or wireless communication of device data 804 (e.g., received data, data that is being received, data scheduled for broadcast, data packets of the data, etc.). Device data 804 or other device content can include configuration settings of the device, media content stored on the device, and/or information associated with a user of the device. Media content stored on computing system 800 can include any type of audio, video, and/or image data. Computing system 800 includes one or more data inputs 806 via which any type of data, media content, and/or inputs can be received, such as human utterances, interactions with a radar field, user-selectable inputs (explicit or implicit), messages, music, television media content, recorded video content, and any other type of audio, video, and/or image data received from any content and/or data source.

Computing system 800 also includes communication interfaces 808, which can be implemented as any one or more of a serial and/or parallel interface, a wireless interface, any type of network interface, a modem, and as any other type of communication interface. Communication interfaces 808 provide a connection and/or communication links between computing system 800 and a communication network by which other electronic, computing, and communication devices communicate data with computing system 800.

Computing system 800 includes one or more processors 810 (e.g., any of microprocessors, controllers, and the like), which process various computer-executable instructions to control the operation of computing system 800 and to enable techniques for, or in which can be embodied, non-line-of-sight radar-based gesture recognition. Alternatively or in addition, computing system 800 can be implemented with any one or combination of hardware, firmware, or fixed logic circuitry that is implemented in connection with processing and control circuits which are generally identified at 812. Although not shown, computing system 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Computing system 800 also includes computer-readable media 814, such as one or more memory devices that enable persistent and/or non-transitory data storage (i.e., in contrast to mere signal transmission), examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Computing system 800 can also include a mass storage media device 816.

Computer-readable media 814 provides data storage mechanisms to store device data 804, as well as various device applications 818 and any other types of information and/or data related to operational aspects of computing system 800. For example, an operating system 820 can be maintained as a computer application with computer-readable media 814 and executed on processors 810. Device applications 818 may include a device manager, such as any form of a control application, software application, signal-processing and control module, code that is native to a particular device, a hardware abstraction layer for a particular device, and so on.

Device applications 818 also include any system components, engines, or managers to implement non-line-of-sight radar-based gesture recognition. In this example, device applications 818 include field manager 206 and system manager 224.

CONCLUSION

Although embodiments of techniques using, and apparatuses enabling, non-line-of-sight radar-based gesture recognition have been described in language specific to features and/or methods, it is to be understood that the subject of the appended claims is not necessarily limited to the specific features or methods described. Rather, the specific features and methods are disclosed as example implementations enabling non-line-of-sight radar-based gesture recognition.

What is claimed is:

1. A computer-implemented method comprising:
    receiving or capturing an image of a room from a perspective of a non-line-of-sight gesture-recognition system;
    receiving or determining dimensions of the room; and
    determining, based at least in part on the image and the dimensions of the room, a volume of the room in which there is no line-of-sight to the non-line-of-sight gesture-recognition system; and
    determining, by providing radar transmissions from the non-line-of-sight gesture-recognition system and into the room, a set of transmission paths sufficient to cause a reflected radar field to be provided within at least a portion of the volume, the reflected radar field enabling capture of gesture interactions with the reflected radar field.

2. The computer-implemented method of claim 1, wherein determining the volume of the room further comprises tracking, with a radar transmission, a person or animal's movement in the room and, during a portion of the movement, not receiving a reflection from the person or animal or a part of the person or the animal.

3. The computer-implemented method of claim 1, wherein determining the volume of the room further comprises:
    providing a radar field effective to receive reflections from objects in the room; and
    determining the volume of the room in which there is no line-of-sight to the non-line-of-sight gesture-recognition system as behind the objects relative to the non-line-of-sight gesture-recognition system.

4. The computer-implemented method of claim 1, wherein determining the set of transmission paths iteratively provides the radar transmissions and correlating reflections from the iteratively provided radar transmissions.

5. The computer-implemented method of claim 1, further comprising:
    providing the reflected radar field within the volume;
    receiving a reflection of a gesture interaction made within the volume; and
    determining, based on the reflection of the gesture interaction, a gesture made within the volume.

6. The computer-implemented method of claim 1, further comprising determining, based on the dimensions of the room and the image of the room, non-imaged but existing floor, wall, or ceiling areas and wherein determining the volume of the room in which there is no line-of-sight to the non-line-of-sight gesture-recognition system is based in part on the non-imaged but existing floor, wall, or ceiling areas.

7. A computer-implemented method comprising:
    providing, through a non-line-of-sight gesture-recognition system, a radar field within a room, the radar field including direct radar fields and reflected radar fields, the reflected radar fields being reflected off of a surface of the room and provided in one or more volumes in the room to which direct line-of-sight from the non-line-of-sight gesture-recognition system is not available;
    receiving a reflection of a gesture interaction made within the radar field within the room, the reflection enabling capture of data about the gesture interaction;
    determining a gesture based on captured data associated with the reflection of the gesture interaction; and
    providing the gesture to a device or application effective to control the device or application.

8. The computer-implemented method of claim 7, wherein the reflection of the gesture interaction is made within one of the reflected radar fields.

9. The computer-implemented method of claim 7, wherein providing the radar field within the room further provides penetration radar fields within portions of the one or more volumes of the room in which the direct line-of-sight from the non-line-of-sight gesture-recognition system is not available.

10. The computer-implemented method of claim 9, wherein the reflection of the gesture interaction is made within one of the penetration radar fields.

11. A computer-implemented method comprising:
    providing a radar field;
    sensing reflections from an interaction that is within the radar field;
    recognizing, at a smart device associated with the radar field and based on the reflections from the interaction that is within the radar field, a gesture;
    determining that the gesture is associated with a non-line-of-sight smart device; and
    passing the gesture from the smart device to the non-line-of-sight smart device in a format usable by the non-line-of-site smart device to recognize the gesture and effective to enable the gesture to control the non-line-of-sight smart device or establish communication with the non-line-of-sight smart device.

12. The computer-implemented method of claim 11, wherein providing the radar field provides a direct radar field and reflected radar field, the reflected radar field provided in one or more volumes in the room to which direct line-of-sight from the non-line-of-sight gesture-recognition system is not available, the interaction is within the reflected radar field, and sensing the reflections is from the interaction within the reflected radar field.

13. The computer-implemented method of claim 12, wherein sensing the reflections from the interaction within the reflection radar field are received at an antenna of the non-line-of-sight gesture-recognition system and reflected from a surface of the room.

14. The computer-implemented method of claim 11, wherein providing the radar field provides a direct radar field and penetration radar field, the penetration radar field provided in one or more volumes in the room to which direct line-of-sight from the non-line-of-sight gesture-recognition system is not available, the interaction is within the penetration radar field, and sensing the reflections is from the interaction within the penetration radar field.

15. The computer-implemented method of claim 14, wherein sensing the reflections from the interaction within the penetration radar field are received at an antenna of the non-line-of-sight gesture-recognition system and through an object occluding the interaction within the penetration radar field.

16. The computer-implemented method of claim 11, further comprising receiving a second gesture from a second non-line-of-sight gesture-recognition system of the non-line-of-sight smart device, the second gesture associated with the smart device and effective to enable the second gesture to control the smart device.

17. The computer-implemented method of claim 11, wherein determining that the gesture is associated with the non-line-of-sight smart device maps the gesture to a pre-configured control gesture associated with a control input for an application associated with the non-line-of-sight smart device.

18. The computer-implemented method of claim 11, wherein determining that the gesture is associated with the non-line-of-sight smart device maps the gesture to a pre-configured communication-establishment gesture associated the non-line-of-sight smart device.

19. The computer-implemented method of claim 11, wherein the gesture establishes communication with the non-line-of-sight smart device effective to enable control through a future gesture determined at the smart device and sensed through the non-line-of-sight gesture-recognition system of the smart device.

20. The computer-implemented method of claim 11, wherein determining that the gesture is associated with the non-line-of-sight smart device maps the gesture to a unique gesture of a set of unique gestures unique to each of a set of smart devices.

\* \* \* \* \*